(12) United States Patent
Lee et al.

(10) Patent No.: US 10,321,443 B2
(45) Date of Patent: Jun. 11, 2019

(54) METHOD FOR PERFORMING A PUCCH TRANSMISSION ON A DEACTIVATED PUCCH SCELL IN A CARRIER AGGREGATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/551,263

(22) PCT Filed: Mar. 8, 2016

(86) PCT No.: PCT/KR2016/002274
§ 371 (c)(1),
(2) Date: Aug. 15, 2017

(87) PCT Pub. No.: WO2016/159527
PCT Pub. Date: Oct. 6, 2016

(65) Prior Publication Data
US 2018/0063830 A1 Mar. 1, 2018

Related U.S. Application Data

(60) Provisional application No. 62/141,277, filed on Apr. 1, 2015.

(51) Int. Cl.
*H04L 5/00* (2006.01)
*H04W 72/04* (2009.01)
(Continued)

(52) U.S. Cl.
CPC .......... *H04W 72/0413* (2013.01); *H04L 1/18* (2013.01); *H04L 1/1812* (2013.01);
(Continued)

(58) Field of Classification Search
CPC .. H04L 5/0057; H04L 5/001; H04W 72/0413; H04W 24/08; H04W 24/10; H04W 72/0453; H04W 84/045
See application file for complete search history.

(56) References Cited

U.S. PATENT DOCUMENTS

2012/0213207 A1    8/2012  Jang et al.
2015/0215926 A1*   7/2015  Huang .............. H04W 36/0061
                                                  370/329
(Continued)

FOREIGN PATENT DOCUMENTS

WO        2013137666         9/2013

OTHER PUBLICATIONS

PCT International Application No. PCT/KR2016/002274, Notification of Transmittal of the International Search Report and the Written Opinion of the International Searching Authority, or Declaration dated Jun. 29, 2016, 9 pages.
(Continued)

*Primary Examiner* — Mohamed A Kamara
(74) *Attorney, Agent, or Firm* — Lee, Hong, Degerman, Kang & Waimey

(57) ABSTRACT

The present invention relates to a wireless communication system. More specifically, the present invention relates to a method and a device for performing PUCCH transmission in a carrier aggregation system, the method comprising: receiving an indicator for configuring on a first Secondary Cell (SCell) with Physical Uplink Control Channel (PUCCH) resource; deactivating the first SCell; and transmitting PUCCH signal on the first SCell configured with the
(Continued)

PUCCH resource while the first SCell is in a deactivated status.

12 Claims, 6 Drawing Sheets

(51) Int. Cl.
*H04L 1/18* (2006.01)
*H04W 76/27* (2018.01)

(52) U.S. Cl.
CPC .......... *H04L 5/0048* (2013.01); *H04L 5/0053* (2013.01); *H04L 5/0057* (2013.01); *H04L 5/0098* (2013.01); *H04W 76/27* (2018.02)

(56) References Cited

U.S. PATENT DOCUMENTS

2016/0270107 A1* 9/2016 Dinan .................... H04L 69/22
2016/0278073 A1* 9/2016 Dinan .................... H04W 48/08
2017/0332354 A1* 11/2017 Chang ............... H04M 3/42289
2018/0049186 A1* 2/2018 Hong .................... H04L 5/0032

OTHER PUBLICATIONS

Alcatel-Lucent, "PUCCH on SCell for CA enhancement", 3GPP TSG RAN WG1 Meeting #80, R1-150167, Feb. 2015, 5 pages.
Huawei, Support of PUCCH on SCell based on dual connectivity mechanism, 3GPP TSG RAN WG1 Meeting #80, R1-150067, Feb. 2015, 4 pages.
3rd Generation Partnership Project (3GPP), "Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 12)," 3GPP TS 36.523-1 V12.5.0, Mar. 2015, 412 pages.

* cited by examiner

[Fig. 1]
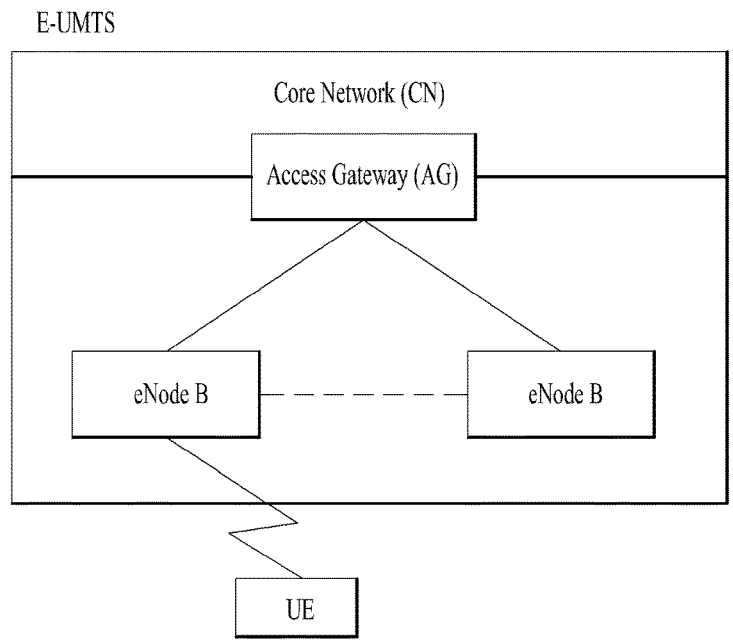
[Fig. 2A]
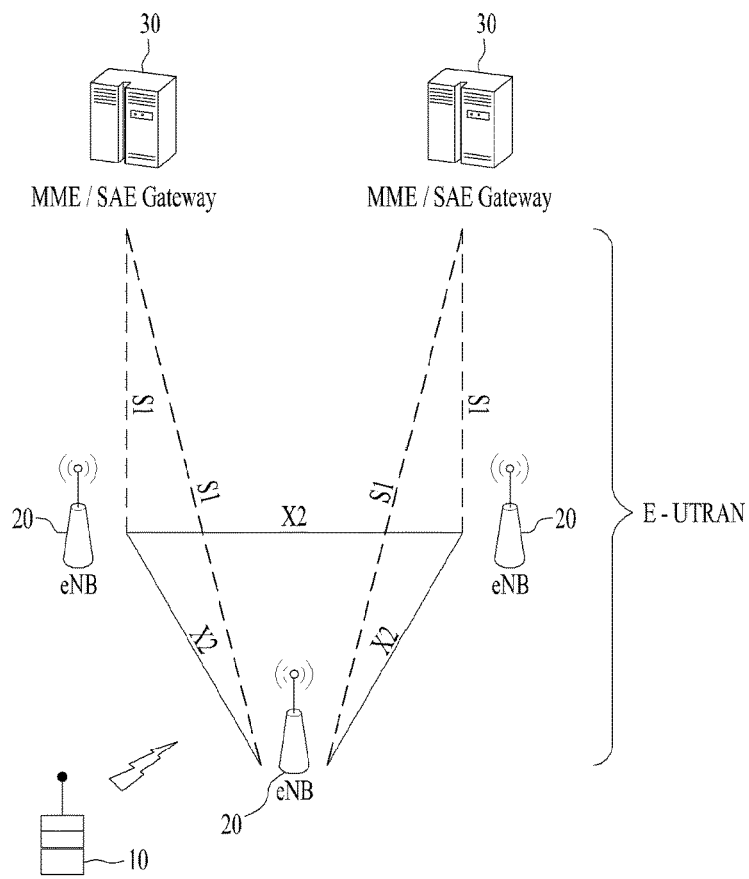

[Fig. 2B]
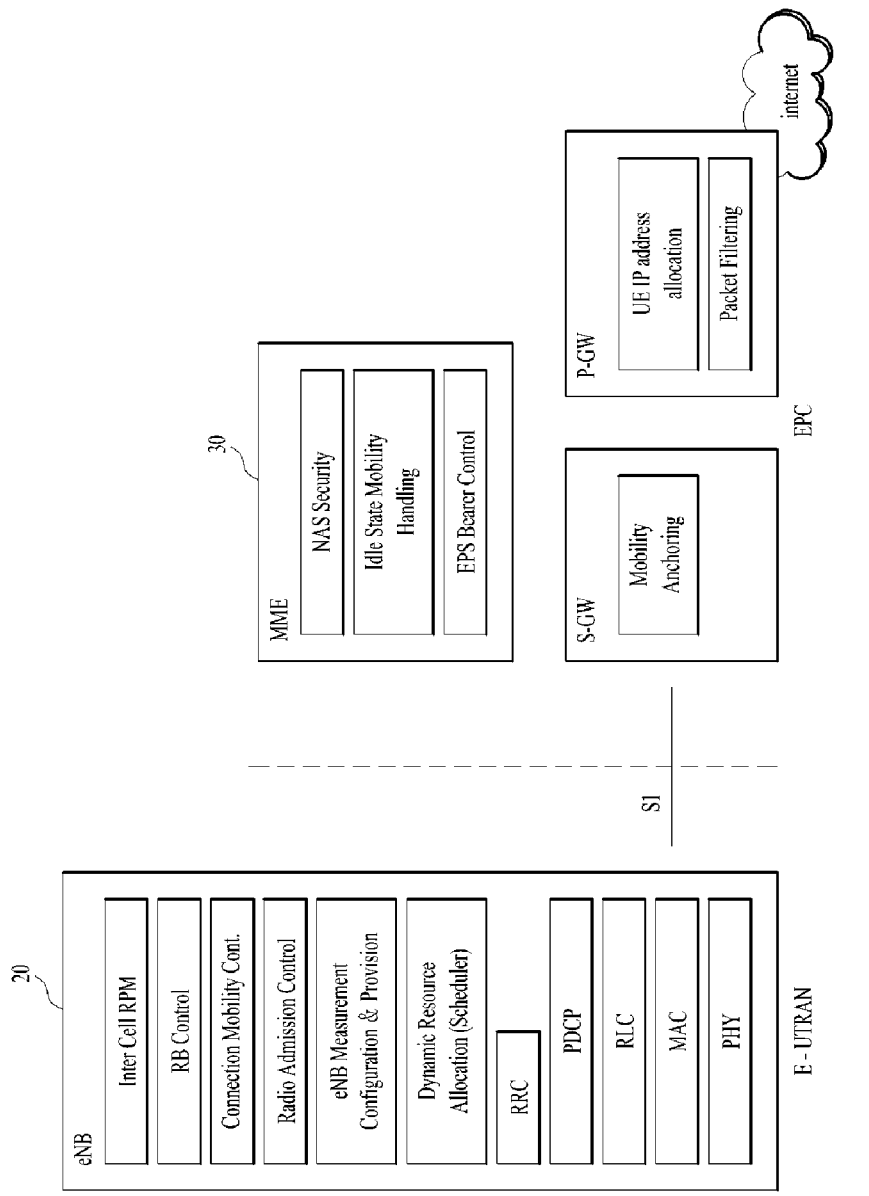

[Fig. 3]
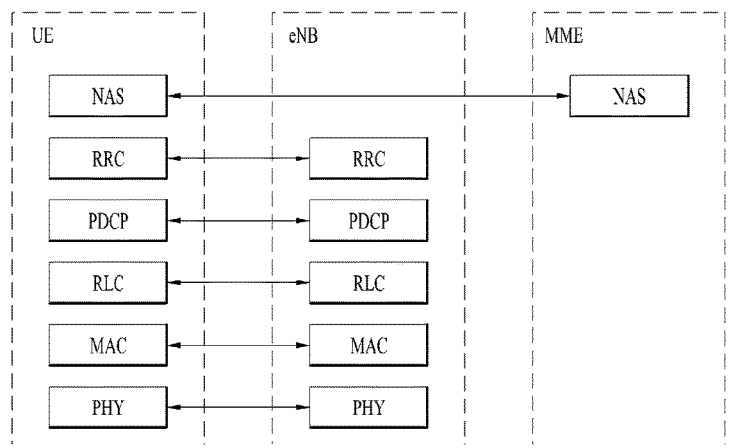
(a) Control-Plane Protocol Stack
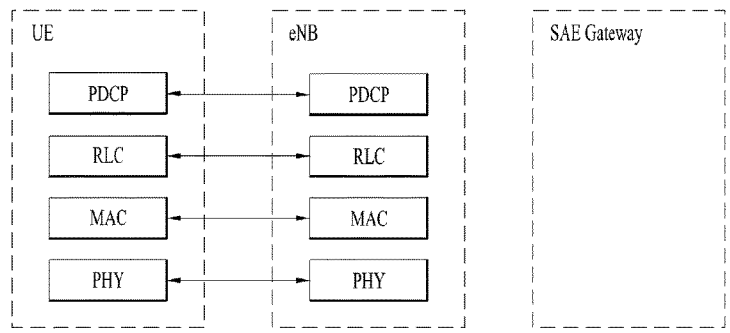
(b) User-Plane Protocol Stack
[Fig. 4]
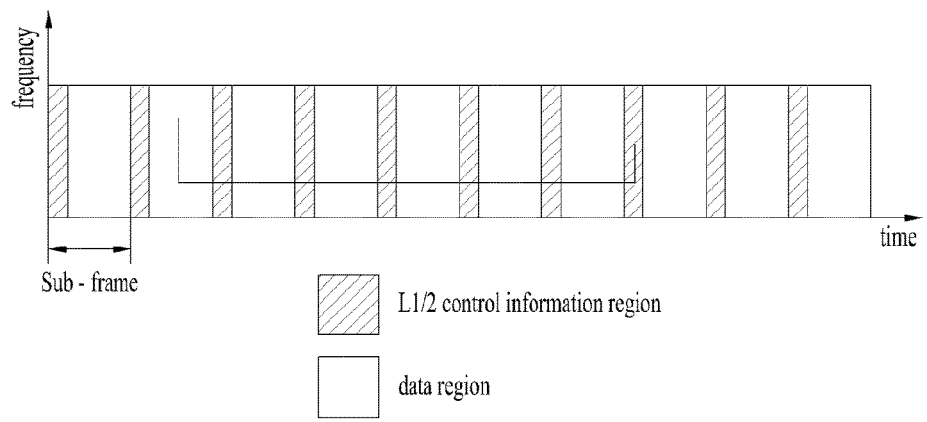

[Fig. 5]
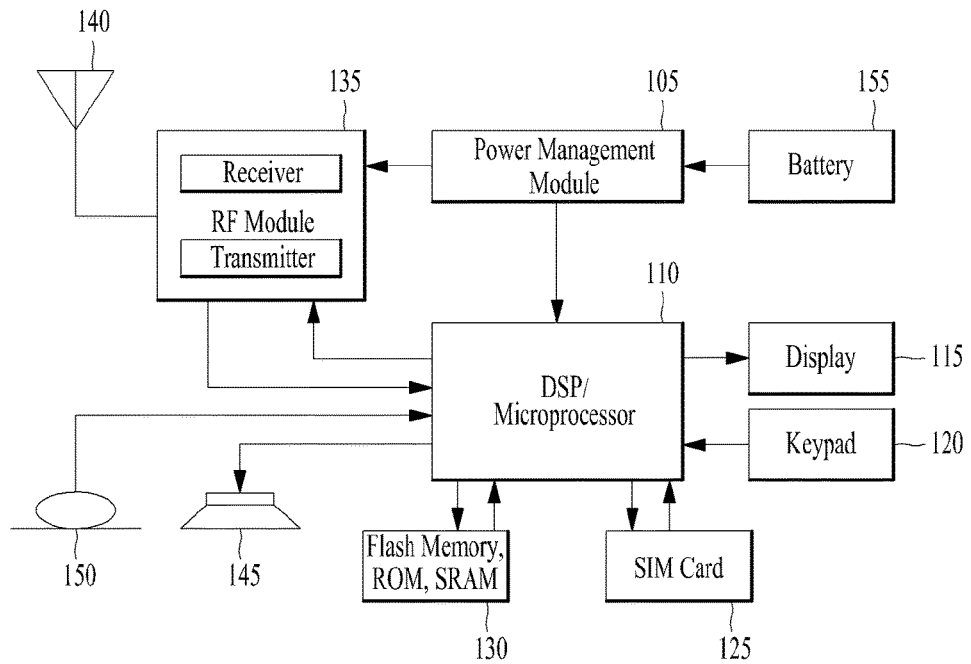
[Fig. 6]
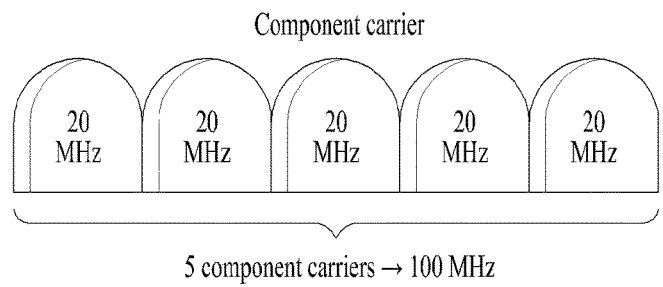
[Fig. 7A]
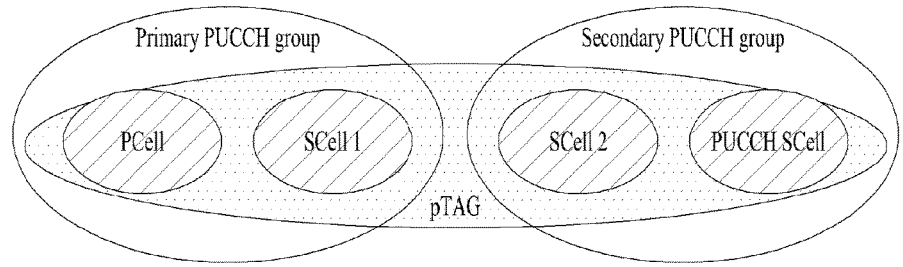

[Fig. 7B]
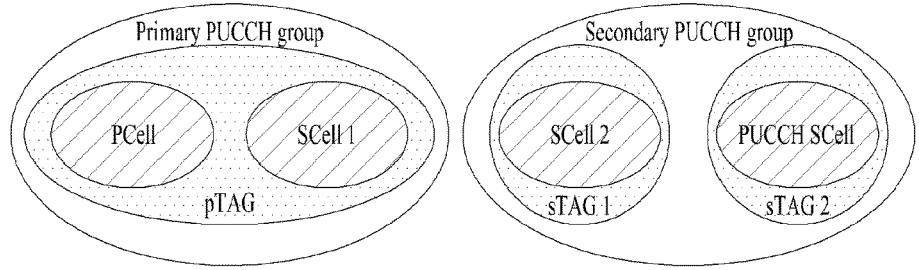
[Fig. 7C]
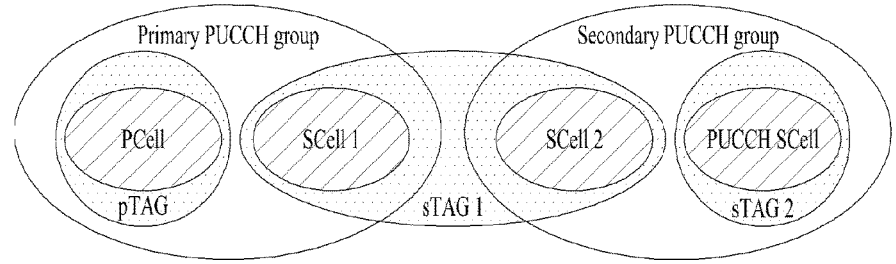
[Fig. 8]
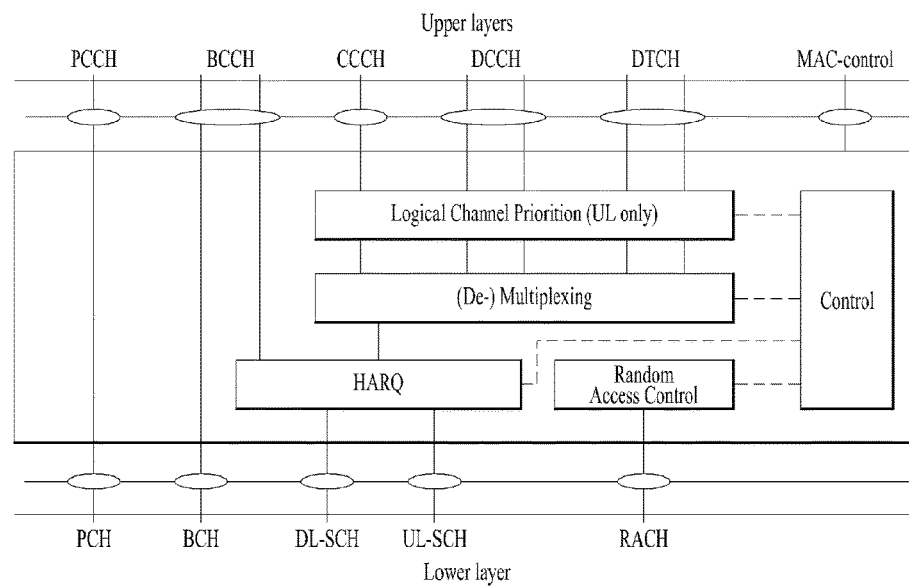
[Fig. 9]
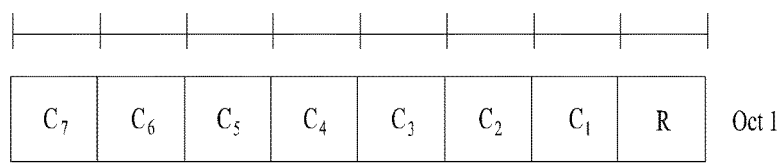

[Fig. 10]
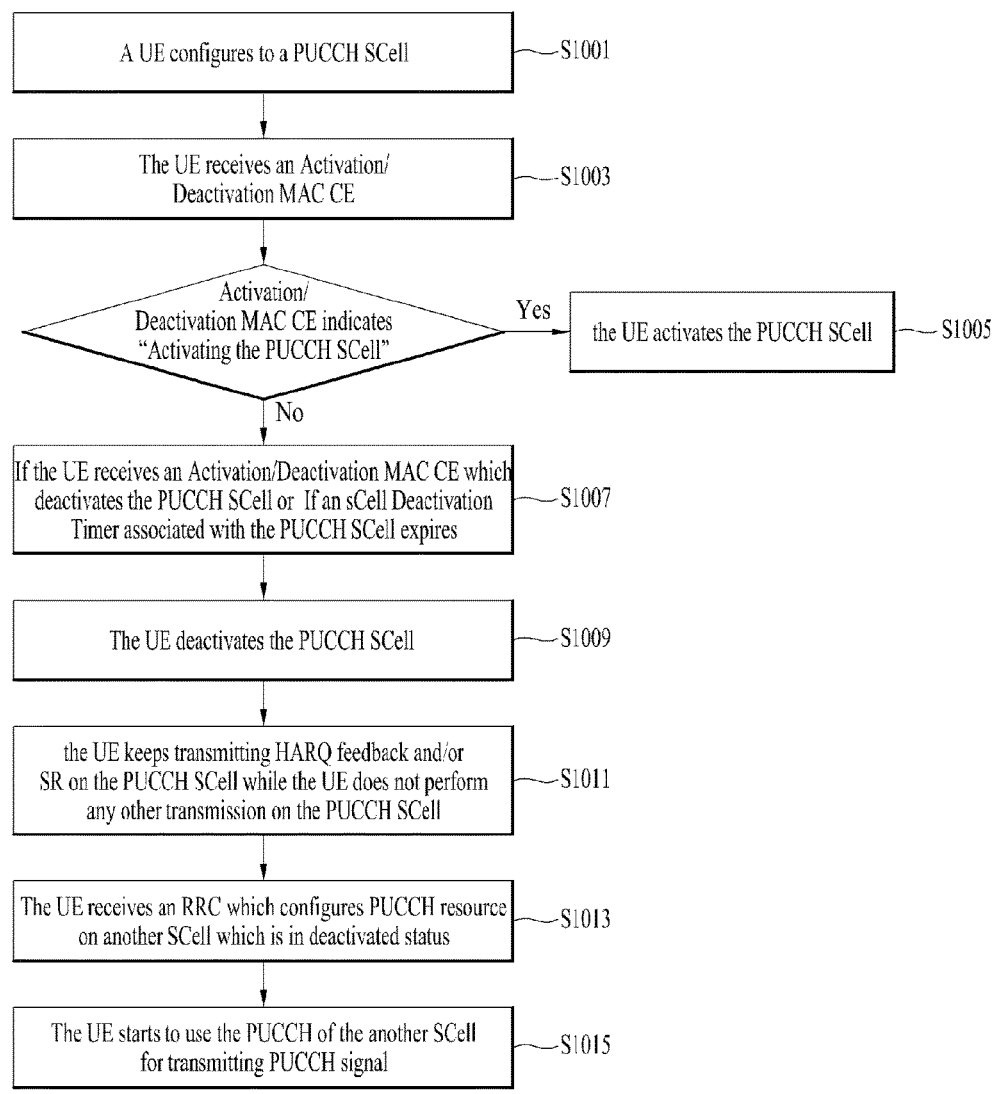

METHOD FOR PERFORMING A PUCCH TRANSMISSION ON A DEACTIVATED PUCCH SCELL IN A CARRIER AGGREGATION SYSTEM AND A DEVICE THEREFOR

CROSS-REFERENCE TO RELATED APPLICATIONS

This application is the National Stage filing under 35 U.S.C. 371 of International Application No. PCT/KR2016/002274, filed on Mar. 8, 2016, which claims the benefit of U.S. Provisional Application No. 62/141,277, filed on Apr. 1, 2015, the contents of which are all hereby incorporated by reference herein in its entirety.

TECHNICAL FIELD

The present invention relates to a wireless communication system and, more particularly, to a method for performing a PUCCH transmission on a deactivated PUCCH SCell in a carrier aggregation system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for performing a PUCCH transmission on a deactivated PUCCH SCell in a carrier aggregation system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

According to the present invention, a PUCCH transmission can be efficiently performed in a carrier aggregation system. Specifically, if a PUCCH SCell is deactivated, the UE keeps PUCCH transmission on the PUCCH SCell while the UE does not perform any other transmission on the PUCCH SCell It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a diagram for carrier aggregation;

FIGS. 7A to 7C are example scenario of Carrier Aggregation;

FIG. 8 is a diagram for MAC structure overview in a UE side;

FIG. 9 is a diagram for an activation/deactivation MAC control element; and

FIG. 10 is a conceptual diagram for performing a PUCCH transmission on a deactivated PUCCH SCell in a carrier aggregation system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a diagram for carrier aggregation.

Carrier Aggregation (CA) technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

FIGS. 7A to 7C are example scenario of Carrier Aggregation.

We'd like to define a few terms commonly used in the Carrier Aggregation. "PUCCH SCell" is a Scell that is configured with PUCCH. "Primary PUCCH group" is a group of serving cells including PCell whose PUCCH signaling is associated with the PUCCH on PCell. "Secondary PUCCH group" is a group of SCells whose PUCCH signaling is associated with the PUCCH on the PUCCH SCell. "PUCCH group" is either primary PUCCH group or a secondary PUCCH group.

FIG. 7A is a scenario indicating that one TAG contains multiple serving cells with PUCCH. FIG. 7B is a scenario indicating each TAG only comprises cells of one PUCCH group. FIG. 7C is a scenario indicating a TAG comprises the serving cells (without PUCCH) which belong to the different PUCCH groups. In this case, PUCCH groups shall not simultaneously comprise serving cells of MCG and SCG, and there will be no effort to optimize for the combination of dual connectivity and PUCCH on SCell.

Activation/Deactivation may be supported for PUCCH SCell. While the PUCCH SCell is deactivated in a PUCCH group, SCells belonging to the PUCCH group should not be activated. The eNB is supposed to manage the activation/deactivation status, so no additional UE based mechanism is needed.

FIG. 8 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

The following transport-channel types are defined for LTE:

The Broadcast Channel (BCH) has a fixed transport format, provided by the specifications. It is used for transmission of parts of the BCCH system information, more specifically the so-called Master Information Block (MIB).

The Paging Channel (PCH) is used for transmission of paging information from the PCCH logical channel. The PCH supports discontinuous reception (DRX) to allow the terminal to save battery power by waking up to receive the PCH only at predefined time instants. The Downlink Shared Channel (DL-SCH) is the main transport channel used for transmission of downlink data in LTE. It supports key LTE features such as dynamic rate adaptation and channel-dependent scheduling in the time and frequency domains, hybrid ARQ with soft combining, and spatial multiplexing. It also supports DRX to reduce terminal power consumption while still providing an always-on experience. The DL-SCH is also used for transmission of the parts of the BCCH system information not mapped to the BCH. There can be multiple DL-SCHs in a cell, one per terminal scheduled in this TTI, and, in some subframes, one DL-SCH carrying system information.

The Multicast Channel (MCH) is used to support MBMS. It is characterized by a semi-static transport format and semi-static scheduling. In the case of multi-cell transmission using MBSFN, the scheduling and transport format configuration is coordinated among the transmission points involved in the MBSFN transmission.

The Uplink Shared Channel (UL-SCH) is the uplink counterpart to the DL-SCH? that is, the uplink transport channel used for transmission of uplink data.

In addition, the Random-Access Channel (RACH) is also defined as a transport channel, although it does not carry transport blocks.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling? for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

FIG. 9 is a diagram for an activation/deactivation MAC control element.

If the MAC entity is configured with one or more SCells, the network may activate and deactivate the configured SCells. The SpCell (i.e., PCell and/or PSCell) is always activated. The network activates and deactivates the SCell(s) by sending the Activation/Deactivation MAC control element. Furthermore, the MAC entity maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The MAC entity may for each TTI and for each configured SCell activate the SCell; i.e. apply normal SCell operation if the MAC entity receives an Activation/Deactivation MAC control element in this TTI activating the SCell.

Normal SCell operation includes SRS transmissions on the SCell, CQI/PMI/RI/PTI reporting for the SCell, PDCCH monitoring on the SCell, PDCCH monitoring for the SCell.

When the SCell is activated due to the Activation/Deactivation MAC control element, the MAC entity starts or restarts the sCellDeactivationTimer associated with the SCell, triggers PHR.

Else, if the MAC entity receives an Activation/Deactivation MAC control element in this TTI deactivating the SCell;

or if the sCellDeactivationTimer associated with the activated SCell expires in this TTI, the MAC entity deactivates the SCell, stops the sCellDeactivationTimer associated with the SCell, and flushes all HARQ buffers associated with the SCell.

If PDCCH on the activated SCell indicates an uplink grant or downlink assignment, or if PDCCH on the Serving Cell scheduling the activated SCell indicates an uplink grant or a downlink assignment for the activated SCell, the MAC entity restarts the sCellDeactivationTimer associated with the SCell.

If the SCell is deactivated, the MAC entity does not transmit SRS on the SCell, not report CQI/PMI/RI/PTI for the SCell, not transmit on UL-SCH on the SCell, not transmit on RACH on the SCell, not monitor the PDCCH on the SCell, not monitor the PDCCH for the SCell.

HARQ feedback for the MAC PDU containing Activation/Deactivation MAC control element shall not be impacted by PCell interruption due to SCell activation/deactivation.

The Activation/Deactivation MAC control element is identified by a MAC PDU subheader with LCID as specified in table 1. It has a fixed size and consists of a single octet containing seven C-fields and one R-field. The Activation/Deactivation MAC control element is defined as FIG. 9

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Ci field indicates the activation/deactivation status of the SCell with SCellIndex i, if there is an SCell configured with SCellIndex i. Else, the UE may ignore the Ci field. The Ci field is set to "1" to indicate that the SCell with SCellIndex i shall be activated. The Ci field is set to "0" to indicate that the SCell with SCellIndex i shall be deactivated. R field is a reserved bit, and set to '0'.

The sCellDeactivationTimer is a SCell deactivation timer. Value of the sCellDeactivationTimer is the number of radio frames. For example, value rf4 corresponds to 4 radio frames, value rf8 corresponds to 8 radio frames and so on. E-UTRAN only configures the field if the UE is configured with one or more SCells other than the PSCell and PUCCH SCell. If the field is absent, the UE shall delete any existing value for this field and assume the value to be set to infinity. The same value applies for each SCell of a Cell Group (i.e. MCG or SCG) (although the associated functionality is performed independently for each SCell). Field sCellDeactivationTimer does not apply for the PUCCH SCell.

Up to Rel-12, PUCCH resource can only be configured on SpCell. Accordingly, HARQ feedbacks of all SCells within one cell group (CG) are transmitted via the SpCell.

In Rel-13, it is possible to configure PUCCH resource for an SCell as well as the SpCell. Accordingly, HARQ feedbacks of all SCells in the PUCCH Group are transmitted via the PUCCH SCell of that PUCCH Group.

In the PUCCH Group, as only one PUCCH SCell is used to carry HARQ feedbacks of all SCells, the PUCCH SCell should be handled in a way that it is always possible to transmit the HARQ feedbacks of the SCells via the PUCCH SCell. One way to achieve this is to keep the PUCCH SCell in Activated status if there is at least one activated SCell in the PUCCH Group. This implies that if the PUCCH SCell is deactivated for some reasons, the SCells in the PUCCH Group may need to be deactivated.

As a result, the PUCCH SCell cannot be deactivated depending on the Activation/Deactivation status of other SCells in the PUCCH Group, or the HARQ feedback of the SCell may not be transmitted depending on the Activation/Deactivation status of PUCCH SCell.

From SCell management point of view, to make a linkage between different SCells is not desirable because it is power inefficient and incurs unnecessary delay on data transmission. Therefore, a new mechanism is needed which ensures reliable/continuous HARQ feedback transmission on the PUCCH SCell while encourages independent SCell management.

FIG. 10 is a conceptual diagram for performing a PUCCH transmission on a deactivated PUCCH SCell in a carrier aggregation system according to embodiments of the present invention.

Note that an SCell configured with PUCCH resource is called "PUCCH SCell".

In this invention, if a PUCCH SCell is deactivated, the UE keeps PUCCH transmission on the PUCCH SCell while the UE does not perform any other transmission on the PUCCH SCell. I.e., the UE does not perform SRS/CSI/UL-SCH/RACH transmission on the PUCCH SCell while the UE keeps PUCCH transmission on the PUCCH SCell. In detail, in a PUCCH Group, the UE shall transmit HARQ feedback of the SCells belonging to the same PUCCH Group via the PUCCH SCell even though the PUCCH SCell of the PUCCH Group is in deactivated status.

It is assumed that an eNB configures a PUCCH Group to a UE, where, for the PUCCH Group, the UE transmits HARQ feedback of the SCells belonging to the PUCCH Group on PUCCH of the PUCCH SCell of the PUCCH Group. HARQ feedback and Scheduling Request can be transmitted on PUCCH.

The UE configures to a PUCCH SCell when the UE receives RRC signaling (S1001). In this case, the UE can transmit HARQ feedback and Scheduling Request of the SCells belonging to a PUCCH group including the PUCCH SCell using the PUCCH SCell.

If the UE receives an Activation/Deactivation MAC CE which activates the PUCCH SCell (S1003), the UE activates the PUCCH SCell (S1005). On the activated PUCCH SCell, the UE shall apply the normal PUCCH SCell operation. I.e., the UE performs SRS/CSI/RACH/UL-SCH and PDCCH monitoring on/for the PUCCH SCell.

If the UE receives an Activation/Deactivation MAC CE which deactivates the PUCCH SCell or if an sCellDeactivationTimer associated with the PUCCH SCell expires (S1007), the UE deactivates the PUCCH SCell (S1009). For the deactivated PUCCH SCell, the UE does not transmit SRS on the PUCCH SCell, not report CQI/PMI/RI/PTI for the PUCCH SCell, not transmit on UL-SCH on the PUCCH SCell, not transmit on RACH on the PUCCH SCell, not monitor the PDCCH on the PUCCH SCell, not monitor the PDCCH for the PUCCH SCell. However, the UE keeps PUCCH transmission on the PUCCH SCell. I.e., the UE keeps transmitting HARQ feedback and/or SR on the PUCCH SCell (S1011). For the SCells in the same PUCCH Group, the SCells transmit HARQ feedback of the SCells by using the PUCCH SCell of the PUCCH Group even though the PUCCH SCell is in Deactivated status.

If the PSCell become in deactivated state (Because a PSCell is never deactivated, when UE receives a RRC configuration for changing PSCell, the PSCell can be deactivated.), the PSCell stops all performances including PUCCH transmission.

The PUCCH SCells other than the PSCell could be configured with PUCCH resource in order to offload the PUCCH traffic from the PSCell to other cells. However, the PUCCH SCell has a role for general SCells, unlike PSCell. Thus, unless the PUCCH SCell can be activated or deactivated like as a PSCell, from SCell management point of view, the degree of freedom of scheduling can be significantly diminished. On the other hand, if the PUCCH SCell can be activated or deactivated like as a SCell, the UE should reset the PUCCH group again because all function of PUCCH SCell turn off during the PUCCH SCell is in deactivated state. An object of the present invention devised to solve the problem lies in the UE for keeping PUCCH transmission on the PUCCH SCell while the UE does not perform any other transmission on the PUCCH SCell even though a PUCCH SCell is deactivated.

Additionally, if the UE receives an RRC message which configures PUCCH resource on another SCell which is in deactivated status (S1013), the UE starts to use the PUCCH of the another SCell for transmitting HARQ feedback of other SCells in the same PUCCH Group and/or for transmitting SR (S1015).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
    receiving an indicator for configuring on a first Secondary Cell (SCell) with Physical Uplink Control Channel (PUCCH) resource;
    deactivating the first SCell; and
    transmitting only Hybrid Automatic Repeat reQuest (HARQ) feedback on the first SCell configured with the PUCCH resource while the first SCell is in a deactivated status.

2. The method according to claim 1, wherein the HARQ feedback is HARQ feedback of all SCells in a PUCCH group including the first SCell.

3. The method according to claim 1, wherein when the first SCell is deactivated,
    the UE doesn't transmit Sounding Reference Signal (SRS) on the first SCell,
    the UE doesn't report Channel Quality Indicator (CQI), Precoding Matrix Index (PMI), Rank Indicator (RI), or Precoding Type Indicator (PTI) for the first SCell,
    the UE doesn't transmit on Uplink-Shared Channel (UL-SCH) on the first SCell,
    the UE doesn't transmit on Random Access Channel (RACH) on the first SCell,
    the UE doesn't monitor the Physical Downlink Control Channel (PDCCH) on the first SCell, or
    the UE doesn't monitor the PDCCH for the first SCell.

4. The method according to claim 1, wherein when the UE receives a Medium Access Control (MAC) Control Element (CE) which deactivates the first SCell, the first SCell is deactivated.

5. The method according to claim 1, wherein when a sCellDeactivationTimer associated with the first SCell expires, the first SCell is deactivated.

6. The method according to claim 1, further comprising:
    receiving a Radio Resource Control (RRC) message which configures PUCCH resource on a second SCell which is in deactivated status; and
    starting to use the second SCell for transmitting PUCCH signal of a PUCCH group to which the second SCell belongs.

7. A User Equipment (UE) operating in a wireless communication system, the UE comprising:

a Radio Frequency (RF) module; and a processor configured to control the RF module, wherein the processor is configured to receive an indicator for configuring on a first Secondary Cell (SCell) with Physical Uplink Control Channel (PUCCH) resource, to deactivate the first SCell, and to transmit only Hybrid Automatic Repeat reQuest (HARQ) feedback on the first SCell configured with the PUCCH resource while the first SCell is in a deactivated status.

8. The UE according to claim 7, wherein the HARQ feedback comprises HARQ feedback of all SCells in a PUCCH group including the first SCell.

9. The UE according to claim 7, wherein when the first SCell is deactivated, the UE doesn't transmit Sounding Reference Signal (SRS) on the first SCell, the UE doesn't report Channel Quality Indicator (CQI), Precoding Matrix Index (PMI), Rank Indicator (RI), or Precoding Type Indicator (PTI) for the first SCell, the UE doesn't transmit on Uplink-Shared Channel (UL-SCH) on the first SCell, the UE doesn't transmit on Random Access Channel (RACH) on the first SCell, the UE doesn't monitor the Physical Downlink Control Channel (PDCCH) on the first SCell, or the UE doesn't monitor the PDCCH for the first SCell.

10. The UE according to claim 7, wherein when the UE receives a Medium Access Control (MAC) Control Element (CE) which deactivates the first SCell, the first SCell is deactivated.

11. The UE according to claim 7, wherein when a sCell-DeactivationTimer associated with the first SCell expires, the first SCell is deactivated.

12. The UE according to claim 7, wherein the processor is further configured to receive a Radio Resource Control (RRC) message which configures PUCCH resource on a second SCell which is in deactivated status, and to start to use the second SCell for transmitting PUCCH signal of a PUCCH group to which the second SCell belongs.

* * * * *